United States Patent
Tokuyoshi et al.

(10) Patent No.: US 9,401,038 B2
(45) Date of Patent: Jul. 26, 2016

(54) INFORMATION PROCESSING APPARATUS, GENERATION METHOD, AND STORAGE MEDIUM

(71) Applicant: SQUARE ENIX CO., LTD., Tokyo (JP)

(72) Inventors: Yusuke Tokuyoshi, Tokyo (JP); Tiago da Silva, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 61 days.

(21) Appl. No.: 14/611,527

(22) Filed: Feb. 2, 2015

(65) Prior Publication Data

US 2015/0235411 A1   Aug. 20, 2015

(30) Foreign Application Priority Data

Feb. 14, 2014   (JP) ................. 2014-026419

(51) Int. Cl.

| | |
|---|---|
| G06T 15/00 | (2011.01) |
| G06T 15/50 | (2011.01) |
| G06T 15/20 | (2011.01) |
| G06T 15/60 | (2006.01) |
| G06T 15/04 | (2011.01) |

(52) U.S. Cl.
CPC ........... G06T 15/00 (2013.01); G06T 15/04 (2013.01); G06T 15/205 (2013.01); G06T 15/50 (2013.01); G06T 15/60 (2013.01); G06T 2215/12 (2013.01)

(58) Field of Classification Search
CPC ............ G06T 15/60; G06K 9/46; G06K 9/52
IPC ................. G06T 15/60; G06K 9/46, 9/6267
See application file for complete search history.

(56) References Cited

U.S. PATENT DOCUMENTS

| 7,283,244 B2 * | 10/2007 | Takagi ............... G01J 3/46 356/446 |
| 2009/0157649 A1 * | 6/2009 | Papadakis ......... G06F 17/30259 707/E17.017 |

OTHER PUBLICATIONS

Extended European Search Report (EESR) issued by European Patent Office (EPO) in European Patent Application No. 15152398.2, dated Aug. 18, 2015.
Olano et al., "LEAN mapping", Proceedings of the 2010 ACM SIGGRAPH Symposium on Interactive 3D Graphics and Games, 13D10, pp. 181-188, XP055206173 (Jan. 1, 2010).
Scherzer et al., "A Survey of Real-Time Hard Shadow Mapping Methods", Computer Graphics forum, vol. 30, No. 1, pp. 169-186, XP055206201 (Mar. 17, 2011).

(Continued)

*Primary Examiner* — Ulka Chauhan
*Assistant Examiner* — Dhirajlal Manvar
(74) *Attorney, Agent, or Firm* — Greenblum & Bernstein, P.L.C.

(57) ABSTRACT

An information processing apparatus analyzes an importance distribution in a render target range for which a three-dimensional scene is to be rendered in a perspective for generating a map for use in rendering the three-dimensional scene. The apparatus acquires eigenvectors of the importance distribution by performing principal component analysis on the distribution. In a case where the eigenvectors of the distribution satisfies a predetermined condition, the apparatus rotates the importance distribution such that a direction defined by the eigenvector is to be a predetermined direction, and determines the number of pixels assigned to each partial region based on the rotated distribution.

9 Claims, 6 Drawing Sheets

(56) References Cited

OTHER PUBLICATIONS

Ian T. Jolliffe, "Principal Component Analysis: A Beginner's Guide—I. Introduction and Application", Weather, Royal Meteorological Society, Bracknell, GB, vol. 45, No. 10, pp. 375-382, XP001088249 (Oct. 1, 1990).

Tokuyoshi et al., "Directionality-Aware Rectilinear Texture Warped Shadow Maps", 20140727; 20140810-20140814, pp. 1, XP058054359 (Jul. 27, 2014).

David G. Lowe, "Distinctive Image Features from Scale-Invariant Keypoints", International Journal of Computer Vision, vol. 60, No. 2, pp. 91-110, XP055203065 (Jan. 5, 2004).

Lloyd et al., "Warping and Partitioning for Low Error Shadow Maps", Proceedings of the 17$^{th}$ Eurographics Conference on Rendering Techniques, pp. 215-226, XP055206308 (Jun. 26, 2006).

Wimmer et al., "Light Space Perspective Shadow Maps", revised version, Eurographics Symposium on Rendering, pp. 1-9, XP055206309 (Jan. 1, 2004).

Yusuke Tokuyoshi et al., "Adaptive Ray-bundle Tracing with Memory Usage Prediction: Efficient Global Illumination in Large Scenes", Pacific Graphics, Computer Graphics Forum, vol. 32, No. 7, pp. 1-10 (2013).

Randima Fernando et al., "Adaptive Shadow Maps", SIGGRAPH 2001 Paper, pp. 387-390 (2001).

Tobias Ritschel et al., "Making Imperfect Shadow Maps View-Adaptive: High Quality Global Illumination in Large Dynamic Scenes", Computer Graphics Forum, vol. xx, No. z, pp. 1-11 (May 2011).

Paul Rosen, "Rectilinear Texture Warping for Fast Adaptive Shadow Mapping", Interactive 3D Graphics and Games, pp. 151-158 (2012).

\* cited by examiner

INFORMATION PROCESSING APPARATUS, GENERATION METHOD, AND STORAGE MEDIUM

BACKGROUND OF THE INVENTION

1. Field of the Invention

The present invention relates to an information processing apparatus, a generation method, and a storage medium, and particularly to a technique for rendering a three-dimensional scene.

2. Description of the Related Art

3DCG (Three-Dimensional Computer Graphics) is used as a visualization representation method used not only in games and movies, but also in various fields. In the technical field of image generation according to 3DCG, various techniques are proposed in recent years so as to achieve more photorealistic rendering or to render to a high quality rendering representation.

One of the rendering representations in 3DCG is to render a shadow that is created when light hits an arranged object. A typical example of the method for rendering a shadow created by an object is shadow mapping method. With the shadow mapping method, first, with respect to a perspective from a light source that casts a shadow, a depth map (shadow map) for a render target field is generated. Then, whether or not the shadow is to be created in each pixel of an image that is to be generated is determined based on whether or not the distance between the object in the pixel and the light source exceeds a pixel value (depth value) in the shadow map recorded for the corresponding light path, and whether or not performing the rendering of the shadow is controlled. That is, with the shadow mapping method, each pixel in the shadow map indicates the distance to a plane (fragment) that a ray emitted from the corresponding position of the light source or in the corresponding direction firstly hits, and thus it is easily determined that the shadow is to be rendered for the fragments located at positions beyond the distance in the light path of the ray.

The quality of a shadow rendered by using the shadow mapping method depends on the resolution of the shadow map generated. A case will be considered as an example in which there are two objects that are covered by the same number of pixels in a shadow map. In this case, a shadow caused by one of the objects, which is arranged at a position far from a rendering viewpoint, on a plane located far from the viewpoint occupies a small number of pixels in an image to be generated, and thus the quality of the shadow would not be a problem. On the other hand, a shadow caused by the other object, which is arranged at a position located close to the rendering viewpoint, on a plane located at a short distance from the viewpoint occupies a large number of pixels in the image to be generated. At this time, if the number of pixels of the target object in the shadow map is less than the number of pixels used to render the shadow in the image, the caused shadow is rendered in a plurality of pixels in the image based on one pixel in the shadow map. That is, aliasing occurs in the shadow, which may give impression to the observer that quality degradation in the shadow has occurred in the generated image.

In order to improve the quality of shadows, a method can be conceived to increase the resolution of shadow maps. This method, however, requires an increase in the amount of computation to generate a shadow map and an increase in the memory area used to store the shadow map, and thus the method is not practical. Accordingly, various proposals have been made to generate a shadow map with which a high quality shadow can be rendered while suppressing the increase in the amount of computation and in the amount of data required to generate the shadow map ("Adaptive Shadow Maps", by Randima Fernando et al., SIGGRAPH 2001 Paper, pp. 387 to 390, and "Rectilinear Texture Warping for Fast Adaptive Shadow Mapping", by Paul Rosen, Interactive 3D Graphics and Games 2012, pp. 151 to 158).

Rosen proposes a warping method that analyzes the importance of each region in a field in a perspective from a light source with respect to the rendering viewpoint, and increases or decreases the number of ray bundles assigned to the region in the shadow map according to the importance. According to Rosen, control is performed so as to assign a large number of pixels in the shadow map to a local region having high importance without changing the resolution of the shadow map generated. Thus, it is possible to reduce the occurrence of aliasing in a shadow caused on a plane close to the viewpoint while suppressing the increase in the amount of computation and in the amount of data.

According to the technique of Rosen, an importance map is generated that indicates the importance of each region in the field, the importance distribution is analyzed with respect to each of the horizontal direction and the vertical direction of the importance map so as to identify regions of high importance in the map. Therefore, the use of the technique of Rosen enables warping processing to be appropriately performed in the case where there locally are regions of high importance in the importance map, as shown in FIG. 6A.

On the other hand, in the case where regions of high importance are distributed to extend in a direction that is neither the horizontal direction nor the vertical direction as shown in FIG. 6B, warping processing cannot be appropriately performed even if the importance distribution is analyzed with respect to each of the horizontal direction and the vertical direction according to the technique of Rosen. That is, in the case where regions of high importance are distributed as shown in FIG. 6B, the importance distribution indicates a uniform distribution in the horizontal direction and the vertical direction. Accordingly, according to the technique of Rosen, it is determined that the regions of high importance are distributed throughout the entire map, and as a result, the area assigned to the regions of high importance is not increased in the shadow map, and thus it may not be possible to improve the quality of the shadow.

SUMMARY OF THE INVENTION

The present invention was made in view of such problems in the conventional technique. The present invention provides an information processing apparatus, a generation method, and a storage medium with which appropriate warping processing can be performed according to the importance distribution.

The present invention in its first aspect provides an information processing apparatus that generates a map for use in rendering a three-dimensional scene, the apparatus comprising: an analyzer which is able to analyze an importance distribution in a render target range for which the three-dimensional scene is to be rendered in a perspective for generating the map; an acquirer which is able to perform principal component analysis on the importance distribution obtained by the analyzer and to acquire eigenvectors of the distribution; a determiner which is able to determine the number of pixels of the map assigned to each partial region in the render target range based on the importance distribution and the eigenvectors of the distribution acquired by the acquirer; and a generator which is able to generate the map based on the determination made by the determiner, wherein in a case where the eigenvectors of the distribution satisfy a predetermined condition, the determiner rotates the importance distribution such that a direction defined by the eigenvector is to be a predetermined direction, and determines the number of pixels assigned to the each partial region based on the rotated distribution.

The present invention in its second aspect provides a generation method for generating a map for use in rendering a three-dimensional scene, the method comprising: analyzing an importance distribution in a render target range for which the three-dimensional scene is to be rendered in a perspective for generating the map; performing principal component analysis on the importance distribution obtained through the analysis and acquiring eigenvectors of the distribution; determining the number of pixels of the map assigned to each partial region in the render target range based on the importance distribution and the acquired eigenvectors of the distribution; and generating the map based on the determination, wherein in a case where the eigenvectors of the distribution satisfy a predetermined condition, the importance distribution is rotated such that a direction defined by the eigenvector is to be a predetermined direction, and the number of pixels assigned to the each partial region is determined based on the rotated distribution.

Further features of the present invention will become apparent from the following description of exemplary embodiments (with reference to the attached drawings).

DESCRIPTION OF THE EMBODIMENTS

Embodiment 1

Hereinafter, an exemplary embodiment of the present invention will be described in detail with reference to the drawings. The embodiment described below is an example in which the present invention is applied to a PC, as an example of an information processing apparatus, that can generate a shadow map for a predetermined light source used to render a three-dimensional scene. However, the present invention is applicable to any apparatus that can generate a predetermined map for use in rendering through importance analysis of a three-dimensional scene that is a render target.

Configuration of PC 100

Figure 1:
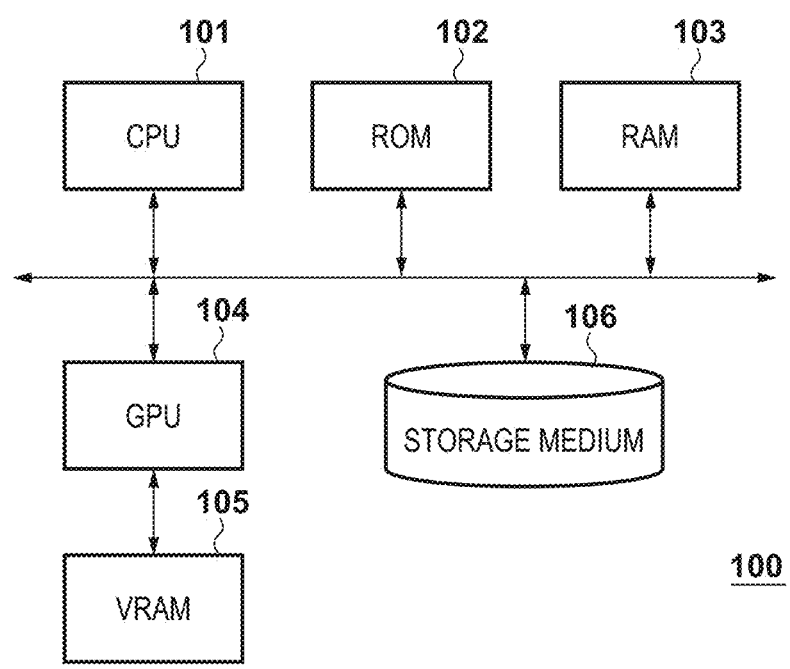
FIG. 1 is a block diagram showing a functional configuration of a PC 100 according to Embodiments of the present invention.

FIG. 1 is a block diagram showing a functional configuration of a PC 100 according to an embodiment of the present invention.

A CPU 101 controls operations of blocks provided in the PC 100. To be specific, the CPU 101 controls the operations of the blocks by reading out an operation program for operating the blocks that is stored in a the ROM 102 or a storage medium 106, loading the program into a RAM 103 and executing the program.

The ROM 102 is, for example, a storage medium such as, for example, a rewritable non-volatile memory. The ROM 102 stores therein, in addition to the operation program for operating the blocks of the PC 100, parameters required to operate the blocks. The RAM 103 is a volatile memory. The RAM 103 is used not only as a loading area for the operation program for operating the blocks, but also as a storage area for storing intermediate data and the like output as a result of the operations of the blocks.

A GPU 104 performs rendering processing of a three-dimensional scene for shadow map generation processing, which will be described later. To be specific, the GPU 104 reads out model data of render objects recorded in, for example, the storage medium 106, which will be described later, and loads the data into a GPU memory (not shown). Then, the GPU 104 processes the model data according to arrangement information provided from the CPU 101, and generates, for example, in a VRAM 105, an image related to the three-dimensional scene that is a target for which a shadow map is to be generated. In the present embodiment, the VRAM 105 is used as an area for generating a shadow map in the shadow map generation processing. The VRAM 105 is also used as a storage area for storing an importance map that is generated through importance analysis for a shadow map for one light source.

The storage medium 106 is a storage medium removably connected to the PC 100, such as for example, an HDD. In the present embodiment, the storage medium 106 stores therein data such as render objects that constitute a three-dimensional scene in the shadow map generation processing and the arrangement information, a program that defines operations of the processing, and the like. The storage medium 106 also stores therein light source parameters used to generate a shadow map such as the position and attribute of the light source arranged in the render target three-dimensional scene.

Shadow Map Generation Processing

Figure 2:
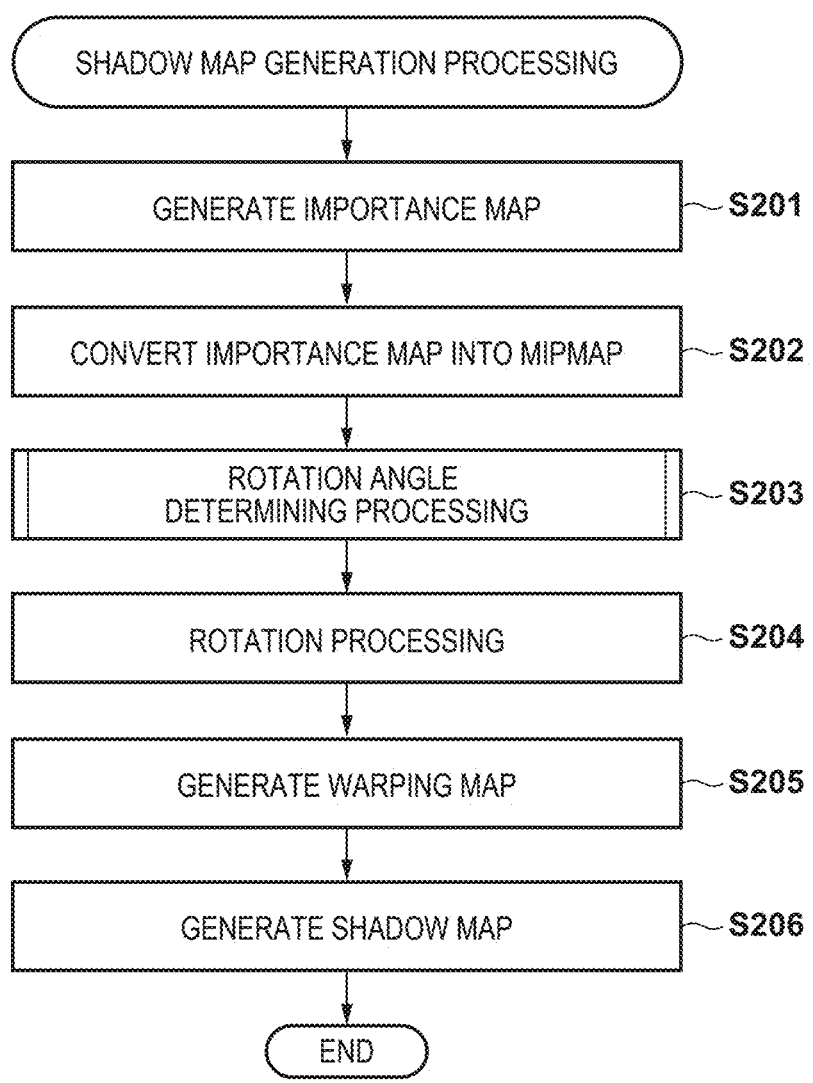
FIG. 2 is a flowchart illustrating shadow map generation processing executed by the PC 100 according to Embodiment 1 of the present invention.

Specific processing for the shadow map generation processing of the PC 100 according to the present embodiment having the above-described configuration will be described with reference to the flowchart shown in FIG. 2. The following description will be given assuming that the shadow map generation processing starts in response to a request to generate a shadow map with respect to one light source for a three-dimensional scene whose, for example, arrangement information or the like is determined. To be more specific, it is assumed that the processing starts when a viewpoint from which rendering is to be performed on the three-dimensional scene is determined, and a request to generate a shadow map for use in rendering an image (output image) from the viewpoint is made.

Also, in the following description, in order to simplify the description, it is assumed that the attribute of the light source defined for the three-dimensional scene is a collimated light source. However, it will be readily appreciated that, in the embodiment of the present invention, the attribute of the light source is not limited to a collimated light source, and it is also possible to use a light source having another attribute such as a point light source or a spotlight.

In step S201, the GPU 104 analyzes the importance distribution in a perspective of the light source (target light source) for generating a shadow map. In the present embodiment, the GPU 104 generates an importance map having a predetermined number of pixels and indicating the analyzed importance distribution, and stores the generated importance map in the VRAM 105. The importance map is two-dimensional data rendered with respect to the perspective in a ray direction of the target light source, which is a collimated light source, and is defined so as to include the entire three-dimensional scene or at least the entire render range in the selected ray direction. The importance map is two-dimensional data in which each pixel stores therein an importance value of the corresponding region in the perspective of the target light source.

Here, a method for quantifying the importance of each partial region of the three-dimensional scene in the perspective of the target light source will be described. In the shadow map generation processing of the present embodiment, the importance of each region is quantified by using the importance functions described in Rosen. The following four functions are defined in Rosen as the functions (importance functions) for use in importance analysis in the perspective of the light source:

Desired View Function;
Distance to Eye Function;
Surface Normal Function; and
Shadow Edge Function.

The importance of each partial region is calculated by summation of values obtained from these functions. To be specific, Desired View Function assigns 1 to a partial region within the range (render range) that is rendered in an output image, and assigns 0 to a partial region that is outside the render range. Here, a partial region for which determination as to whether or not the partial region is included in the render range is determined is not the first fragment (caster) on the light path from the light source, but a fragment (receiver) where a shadow is caused by the caster. Distance to Eye Function assigns a value that is inversely proportional to the distance between a viewpoint determined for the output image and each partial region. Surface Normal Function assigns an inner product of a viewing vector and a normal vector of the fragment. That is, a product of Distance to Eye Function and Surface Normal Function is a value that is proportional to the length of the receiver per pixel in the output image, and a value that is proportional to the length is assigned as the importance. Finally, Shadow Edge Function assigns a greater value to a partial region having a shadow edge portion (boundary). That is, a greater value is assigned to a partial region having a boundary between a light area and a dark area formed when a shadow is cast.

Accordingly, in this step, the GPU 104 receives light source parameters of the target light source and viewpoint parameters of the output image from the CPU 101, and generates an importance map by using the importance functions described above.

In the present embodiment, quantification of importance will be described assuming that it is performed by using the four functions described above, but in the embodiment of the present invention, the quantification of importance is not limited thereto. As described in Rosen, it is possible to use not only a method (Forward Analysis) that performs analysis with respect to the perspective of the target light source, but also to select one of the above method (Forward Analysis), a method (Backward Analysis) that performs analysis with respect to the viewpoint for the output image, and a combination (Hybrid Analysis) thereof according to the scene to be analyzed. It is also possible to select a function that quantifies importance as appropriate according to the analysis method. Also, it will be readily appreciated that the quantification of importance is not limited to the methods that use the importance functions described in Rosen, and the importance may be quantified by using other functions.

In step S202, the VRAM 105 converts the generated importance map into a mipmap in consideration of computation performed in a later step, and stores the resulting map in the VRAM 105.

In step S203, the GPU 104 executes rotation angle determining processing to determine a rotation angle appropriate for warping processing, with respect to the importance distribution in the importance map obtained by the analysis.

Rotation Angle Determining Processing

Figure 3:
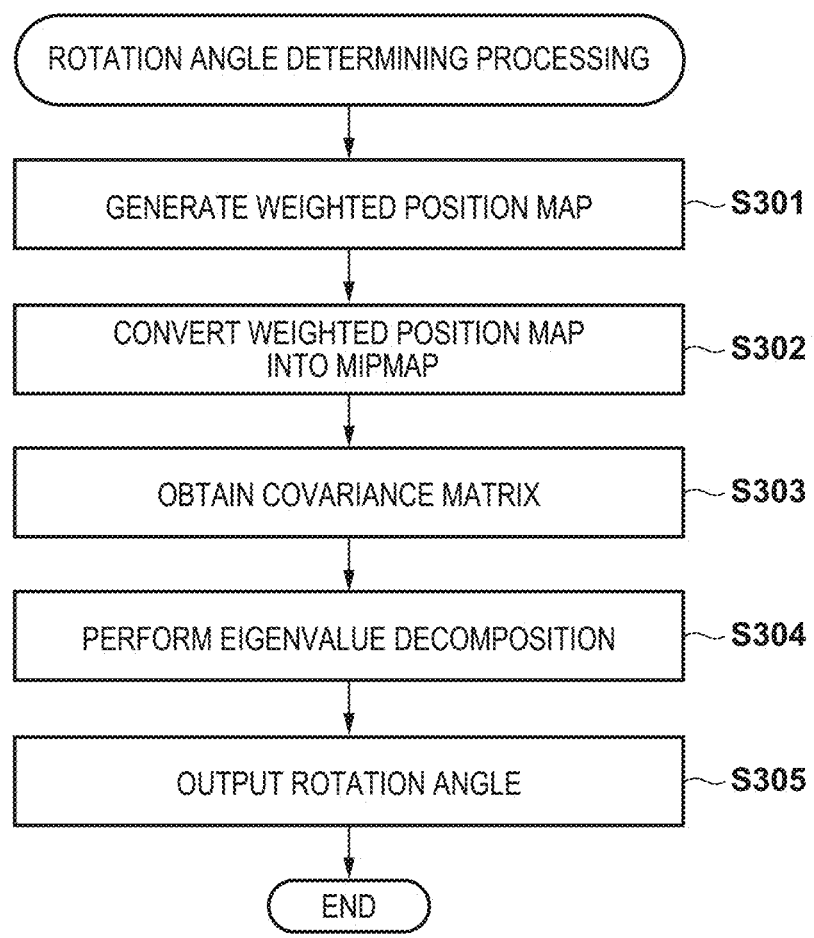
FIG. 3 is a flowchart illustrating rotation angle determining processing executed by the PC 100 according to Embodiment 1 of the present invention.

Here, rotation angle determining processing executed in the shadow map generation processing of the present embodiment will be described in detail with reference to the flowchart shown in FIG. 3. In the present embodiment, a rotation angle suitable for warping processing is determined by analyzing the importance distribution by using principal component analysis (PCA). Also, in the present embodiment, in order to execute the principal component analysis processing at a high speed, the GPU 104 performs the rotation angle determining processing by using a mipmap.

In step S301, with respect to the importance map in the perspective of the target light source, the GPU 104 generates a weighted position map p in which importance has been weighted to two-dimensional coordinates, and stores the generated weighted position map p in the VRAM 105. To be specific, the GPU 104 calculates each set of coordinates as follows so as to generate a weighted position map p(x, y):

$$p(x, y) = [xI(x, y), yI(x, y), x^2I(x, y), y^2I(x, y), xyI(x, y)]$$

where I(x, y) indicates importance (pixel value) in the set of coordinates (x, y) in the importance map.

In step S302, the GPU 104 converts the weighted position map into a mipmap, and stores the resulting mipmap in the VRAM 105.

In step S303, the GPU 104 obtains a covariance matrix of the importance map in the perspective of the target light source. The covariance matrix can be expressed as follows:

$$\begin{bmatrix} E[x^2] - (E[x])^2 & E[xy] - E[x]E[y] \\ E[xy] - E[x]E[y] & E[y^2] - (E[y])^2 \end{bmatrix}$$

Each component of the matrix can be calculated by a weighted average of the positions in the importance map, or specifically the following equation:

$$[E[x], E[y], E[x^2], E[y^2], E[xy]] = \frac{\sum_{x,y} p(x, y)}{\sum_{x,y} I(x, y)}.$$

The weighted average of the positions in the importance map can be easily calculated from a value obtained by multiplying the pixel value of the top layer (1×1 pixel) by the number of pixels of the bottom layer of the importance map or the weighted position map if the importance map and the weighted position map have been converted into a mipmap. That is, the pixel value of the top layer in the mipmap is the average value of the pixel values of the pixels of the bottom layer, and thus in this step, the covariance matrix can be obtained at a high speed through a simple computation.

In step S304, the GPU 104 performs eigenvalue decomposition on the covariance matrix obtained in step S303 so as to acquire a eigenvectors, which are the principal component of the importance distribution.

In step S305, the GPU 104 outputs, as the rotation angle, the argument of an eigenvector having a greater eigenvalue of the acquired eigenvectors of the importance distribution. That is, the GPU 104 outputs, as the rotation angle, an angle obtained by reversing the positive and negative signs of the angle formed between the horizontal axis of the importance map and the eigenvector having a greater eigenvalue.

As described above, in the rotation angle determining processing of the present embodiment, eigenvectors of the importance distribution are acquired by the principal component analysis, and a rotation angle with which the warping processing produces an appropriate result, or in other words, with which a high quality shadow can be rendered by shadow mapping is determined based on the eigenvectors.

After the rotation angle has been determined, in step S204, the GPU 104 rotates the importance map by the rotation angle determined by the rotation angle determining processing. Then, in step S205, the GPU 104 analyzes the importance distribution with respect to each of the horizontal direction and the vertical direction of the rotated importance map, and generates a warping map based on the importance distribution of each direction. The generation of a warping map may be performed by using the Rosen's method. To be specific, the GPU 104 acquires the importance distribution in each direction by extracting the largest value from the pixel values having the same coordinate in the direction. Then, the GPU 104 applies blur to the acquired importance distribution in each direction, and thereafter generates a warping map of the direction by using a computation equation regarding warping described in Rosen.

In step S206, the GPU 104 generates a shadow map in the perspective of the target light source based on the warping map, stores the generated shadow map in the VRAM 105, and ends the shadow map generation processing. In the shadow map generated in this step, a large number of pixels of the shadow map are assigned to a region of high importance. That is, in the shadow map generated in this step, when compared with a shadow map generated without performing the warping processing in the perspective of the target light source, the number of pixels assigned to each partial region corresponding to each pixel of the latter shadow map is varied according to the importance. That is, the number of pixels of the shadow map assigned to a partial region is increased or decreased by the warping processing.

The shadow map generated by the shadow map generation processing of the present embodiment is generated in a state in which rotation has been performed by the rotation angle determining processing, and thus when the shadow map is applied to processing for rendering a three-dimensional scene, it is necessary to perform processing to remove the influence of the rotation. However, the shadow map generated in the embodiment of the present invention is not limited thereto, and the shadow map may be generated in a state in which the rotation has been removed as long as it is possible to define a relationship with a region to be applied.

Also, in the present embodiment, the importance map generated in order to perform the principal component analysis is rotated, and the importance distribution in each of the horizontal direction and the vertical direction is analyzed based on the rotated importance map, but the embodiment of the present invention is not limited thereto. For example, in order to render a higher quality shadow, a configuration is possible in which the upper direction in the perspective of the target light source is changed based on the rotation angle determined by the rotation angle determining processing, and the importance distribution in each direction is analyzed based on an importance map generated again.

Figure 6A:
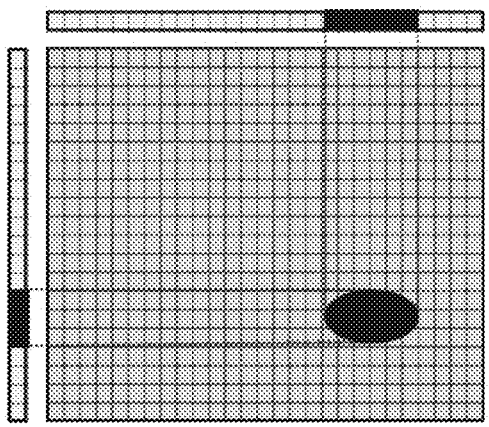
FIGS. 6A and 6B are diagrams showing importance distributions used to explain a conventional technique.
Figure 6B:
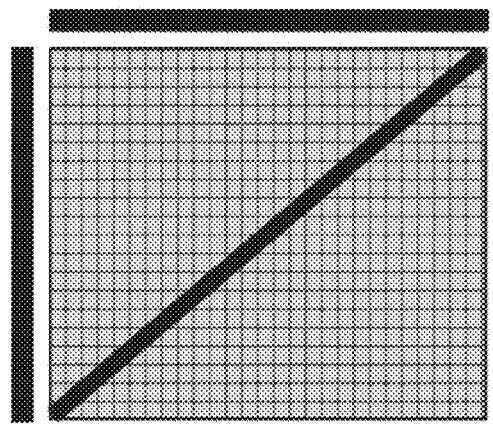

Also, in the present embodiment, the argument of the eigenvector having a greater eigenvalue is determined as the rotation angle determined in the rotation angle determining processing, but the embodiment of the present invention is not limited thereto. That is, by rotating the importance map such that the eigenvector of the importance distribution matches the horizontal direction or the vertical direction irrespective of whether the value is positive or negative, it is possible to execute warping processing that can generate an appropriate shadow map even in the case where the importance is distributed as shown in FIG. 6B. When the importance map is rotated such that the eigenvector matches the horizontal direction or the vertical direction as described above, the rendered shadow has the best image quality. However, in the embodiment of the present invention, the manner in which the importance distribution is rotated is not limited thereto. That is, the image quality of the rendered shadow can be improved by rotating the importance distribution such that the eigenvector of the importance distribution in the perspective of the target light source matches a direction that can be regarded as the horizontal direction or the vertical direction.

Also, in the present embodiment, an example was described in which a shadow map is generated through importance analysis, but the map generated in the implementation of the present invention is not limited thereto. The present invention may be used in, for example, the generation of ray-bundle buffers by ray-bundle tracing technique based on importance analysis, or the generation of bidirectional reflective shadow maps as described in "Making Imperfect Shadow Maps View-Adaptive: High-Quality Global Illumination in Large Dynamic Scenes" by Tobias Ritschel et al., and the like. That is, the present invention is applicable to the generation of maps for use in rendering a three-dimensional scene, which is a render target, based on the importance analysis of the three-dimensional scene described above. In the case of generating a light map, a texel density (the number of pixels per unit area in a system defined within the three-dimensional scene of the light map applied to a plane of a render object having a fragment) in a fragment to which the light map is to be applied can be used as the importance.

As described above, the information processing apparatus of the present embodiment can perform appropriate warping processing according to the importance distribution. To be specific, the information processing apparatus analyzes the importance distribution in a range for which a three-dimensional scene is to be rendered, in the perspective for generation of a map used to render the three-dimensional scene. Then, the information processing apparatus performs the principal component analysis on the obtained importance distribution, acquires eigenvectors of the distribution, determines the number of pixels of the map assigned to each partial region in the render target range based on the eigenvectors of the distribution, and generates a map. In a case where the eigenvectors of the distribution satisfy a predetermined condition, the information processing apparatus rotates the importance distribution such that the direction defined by the eigenvector is to be a predetermined direction, and determines the number of pixels assigned to each partial region based on the rotated distribution.

Through this, the quality of the rendered image can be improved by using the generated map in the rendering of the three-dimensional scene.

Variation

Figure 4:
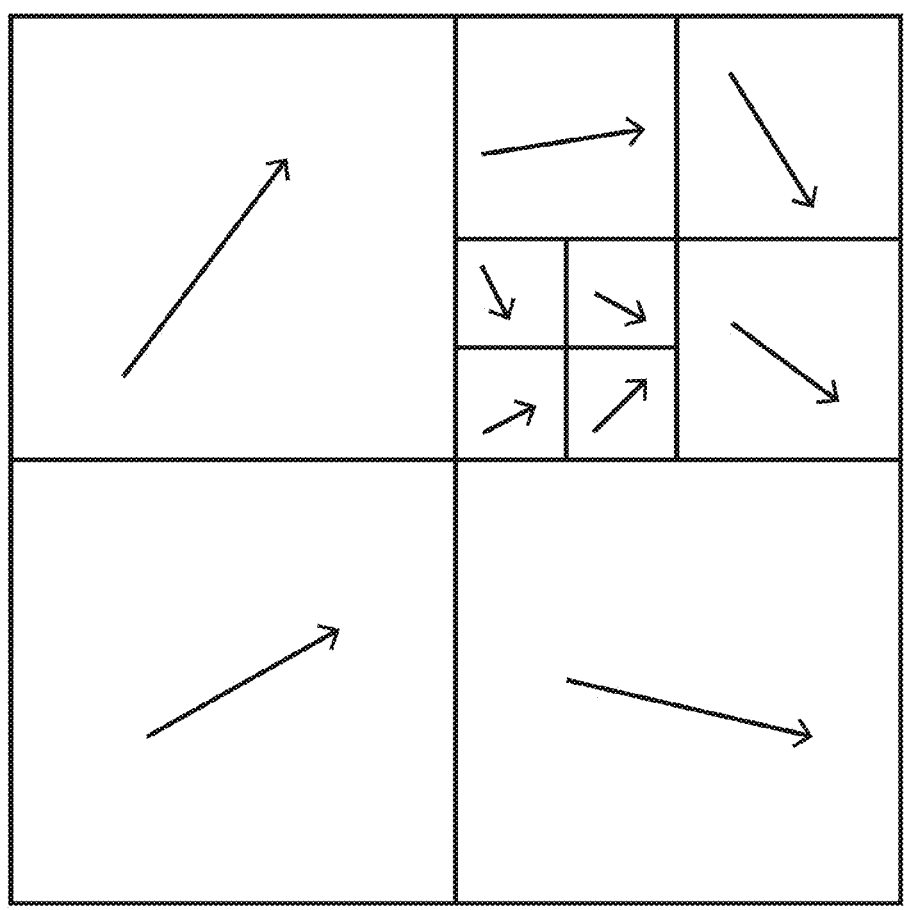
FIG. 4 is a diagram showing rotation for each tile when tiling processing is performed according to a variation of the present invention.

In Embodiment 1 described above, a method for determining the rotation angle of an importance map used to generate an appropriate shadow map by analyzing importance distribution in the entire range in the perspective of the target light source was described, but the implementation of the present invention is not limited thereto. The present invention is also applicable to, for example, the technique in which an area to be analyzed for a scene is divided into regions (tiling) as described in "Adaptive Ray-bundle Tracing with Memory Usage Prediction: Efficient Global Illumination in Large Scenes" by Tokuyoshi et al. That is, a configuration is possible in which importance analysis is performed on each tile as shown in FIG. 4, and each tile is adaptively rotated and warped so as to generate a ray-bundle buffer.

Embodiment 2

In Embodiment 1 and Variation described above, examples were described in which warping processing can be performed appropriately by rotating the importance distribution. In the present embodiment, a method for generating a shadow map by determining whether or not to perform rotation according to the importance distribution will be described. The present embodiment will be described assuming that a PC 100 having the same constituent elements as those described in Embodiment 1 is used.

Shadow Map Generation Processing

Figure 5:
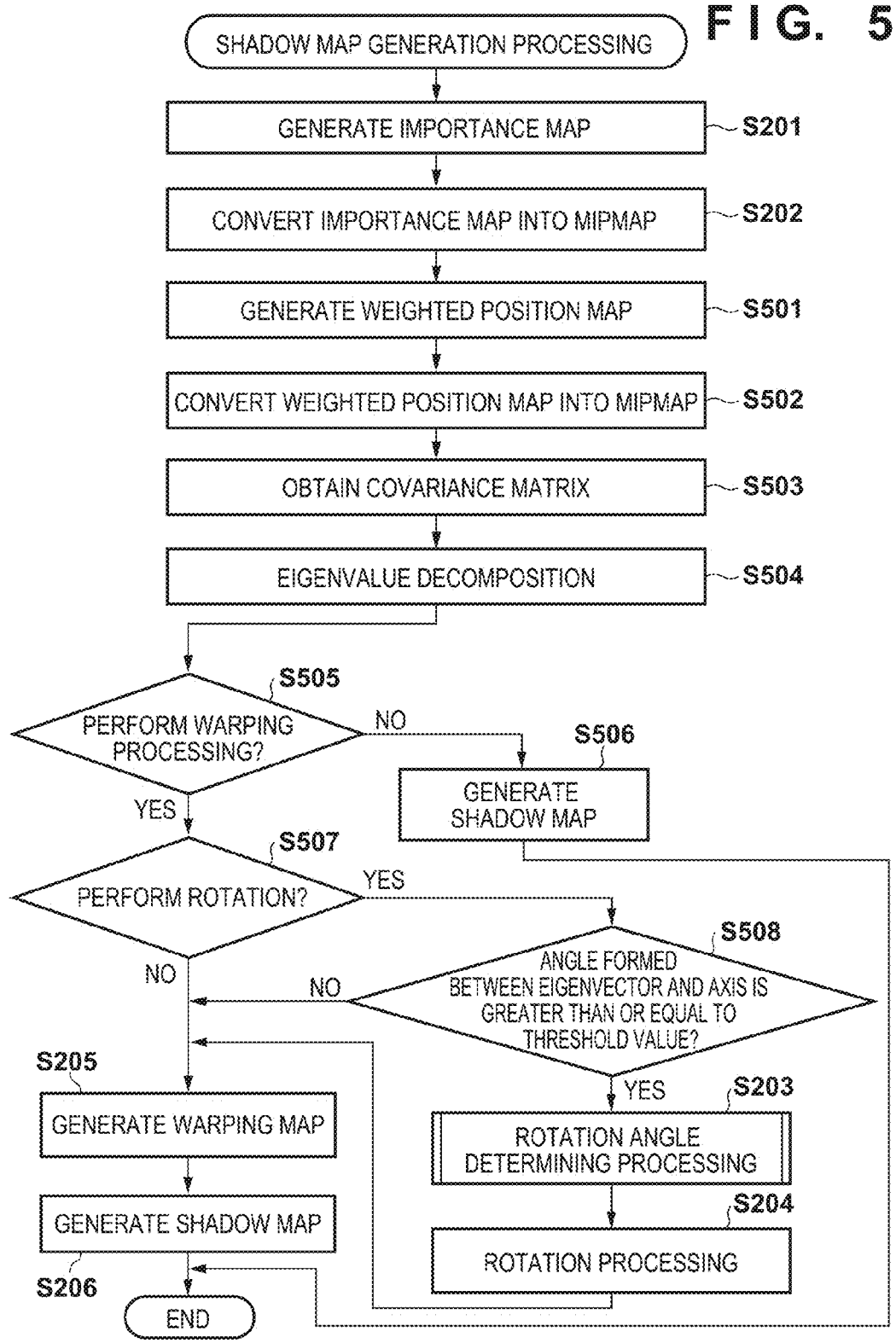
FIG. 5 is a flowchart illustrating shadow map generation processing executed by a PC 100 according to Embodiment 2 of the present invention.

Hereinafter, shadow map generation processing executed by a PC 100 according to the present embodiment will be described in detail with reference to FIG. 5. The description will be given assuming that the shadow map generation processing of the present embodiment starts in response to a request to generate a shadow map with respect to one light source for a three-dimensional scene whose, for example, arrangement information or the like is determined. In the description of the shadow map generation processing of the present embodiment, steps that perform the same processing as those of the shadow map generation processing of Embodiment 1 will be given the same reference numerals, and thus descriptions thereof are not given here. Accordingly, only processing characteristic to the present embodiment will be described. Also, in order to simplify the description, as in Embodiment 1, the following description will be given assuming that the attribute of the light source defined for the three-dimensional scene is a collimated light source.

After generation of the mipmap of the importance map in step S202, in step S501, the GPU 104 generates a weighted position map obtained by weighting importance to two-dimensional coordinates in the importance map in the perspective of the target light source, and stores the generated weighted position map in the VRAM 105.

In step S502, the GPU 104 converts the weighted position map into a mipmap, and stores the resulting mipmap in the VRAM 105.

In step S503, the GPU 104 obtains a covariance matrix of the importance map in the perspective of the target light source.

In step S504, the GPU 104 performs eigenvalue decomposition on the covariance matrix obtained in step S503 so as to acquire eigenvectors, which are the principal component of the importance distribution. The processing from step S501 to step S504 may be the same as the processing from step S301 to step S304 of the rotation angle determining processing of Embodiment 1 described above.

In step S505, the GPU 104 determines whether or not to perform warping processing to generate a shadow map. To be specific, the GPU 104 makes the determination in this step by determining whether or not smaller one of the eigenvalues of the eigenvectors acquired is not greater than a predetermined threshold value. Here, the predetermined threshold value used in this step is a value set in order to determine whether or not the importance distribution is widely spread. That is, in this step, if the eigenvector having a smaller eigenvalue exceeds the threshold value, the GPU 104 determines that the importance distribution is widely spread, rather than determining that the importance distribution has a local bias. If it is determined that the distribution is widely spread, the number of pixels that can be assigned to a partial region determined as having high importance through the warping processing is limited due to the relation to the number of pixels of the shadow map to be generated, and thus irrespective of whether or not rotation is performed, it can be deemed that the effect of improving the quality of the rendered shadow is to be low. Therefore, in the present embodiment, in a case where the smaller eigenvalue exceeds the predetermined threshold value, the GPU 104 determines that the warping processing is not to be performed. Accordingly, if the GPU 104 determines that the warping processing is to be performed to generate a shadow map, it advances the processing to step S507, otherwise if it determines that the warping processing is not to be performed, it advances the processing to step S506.

In step S506, the GPU 104 generates a shadow map in the perspective of the target light source without performing the warping processing, stores the generated shadow map in the VRAM 105, and ends the shadow map generation processing.

If, on the other hand, it is determined in step S505 that the warping processing is to be performed, in step S507, the GPU 104 determines whether or not to perform rotation by determining whether or not the ratio of the greater eigenvalue relative to the smaller eigenvalue exceeds a predetermined threshold value. Here, the predetermined threshold value used in this step is a value set in order to determine whether or not the importance distribution is biased toward a direction of either eigenvector. That is, if the difference between the smaller eigenvalue and the greater eigenvalue is small, the ratio is not greater than the threshold value and this shows that the distribution is equally spread in the directions of the two eigenvectors. In other words, in this case, even if the distribution is rotated, it can be deemed unlikely to cause a change in the result of warping processing. If, on the other hand, the difference between the smaller eigenvalue and the greater eigenvalue is large, the ratio exceeds the threshold value and this shows that the distribution is biased in the direction of the eigenvector having the greater eigenvalue. That is, in this case, by rotating the distribution, it is possible to assign, in at least either of the horizontal direction and the vertical direction, a large number of pixels to a partial region having high importance through the warping processing, and thus it can be deemed that the quality of the rendered shadow can be improved. Accordingly, if the GPU 104 determines that rotation is to be performed, it advances the processing to step S508. If, on the other hand, is the GPU 104 determines that rotation is not to be performed, it advances the processing to step S205, where a warping map is generated for the importance map in which rotation is not performed.

In step S508, the GPU 104 further determines whether or not the magnitude of an angle formed between the eigenvector and the horizontal axis or the vertical axis of the importance map is not less than a predetermined threshold value. Here, the predetermined threshold value used in this step is a value such as 15 (degrees) set in order to determine whether or not the eigenvector indicates the same direction as the horizontal axis or the vertical axis of the importance map. To be more specific, it is a threshold value for the angle (absolute value) provided in order to determine whether or not two orthogonally intersecting straight lines defined by the eigenvectors are regarded as the same as two orthogonally intersecting straight lines defined by the horizontal axis and the vertical axis of the importance map. That is, the GPU 104 determines whether or not an orthogonal coordinate system defined by the eigenvectors is similar to the xy coordinate system of the importance map. If it is determined that the orthogonal coordinate system defined by the eigenvectors is similar to the xy coordinate system of the importance map, it can be deemed that the change in the importance distribution caused by rotation will be small, and thus in the present embodiment, it is determined that rotation is not to be performed. Accordingly, if it is determined that the magnitude of the angle formed between the eigenvector and the horizontal axis or the vertical axis of the importance map is not less than a predetermined threshold value, the GPU 104 advances the processing to step S203, where the rotation angle determining processing is performed. At this time, the eigenvectors of the importance distribution are already obtained, and thus it is sufficient that the GPU 104 performs only the processing of step S305 of the rotation angle determining processing. If, on the other hand, it is determined in step S508 that the magnitude of the angle formed between the eigenvector and the horizontal axis or the vertical axis of the importance map is less than the predetermined threshold value, the GPU 104 advances the processing to step S205, where a warping map is generated for the importance map in which rotation is not performed.

As described above, the PC 100 of the present embodiment can adaptively generate a shadow map with which a shadow having an appropriate quality can be rendered while determining whether or not to perform rotation according to the importance distribution.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the generation method according to the present invention are realizable by a program executing the methods on a computer. The program is providable/distributable by being stored on a computer-readable storage medium or through an electronic communication line.

This application claims the benefit of Japanese Patent Application No. 2014-026419, filed Feb. 14, 2014, which is hereby incorporated by reference herein in its entirety.

What is claimed is:

1. An information processing apparatus that generates a map for use in rendering a three-dimensional scene, the information processing apparatus comprising:
   a processor; and
   a memory including instructions that, when executed by the processor, cause the processor to perform operations including:
   analyzing an importance distribution in a render target range for which the three-dimensional scene is to be rendered in a perspective for generating the map;
   performing principal component analysis on the importance distribution to acquire eigenvectors of the importance distribution;
   determining whether the eigenvectors of the importance distribution satisfy a predetermined condition, and when the predetermined condition is satisfied, rotating the importance distribution such that a direction defined by an eigenvector is to be a predetermined direction;
   assigning a number of pixels to each partial region in the render target range based on the rotated importance distribution;
   generating the map based on the number of pixels assigned to each partial region; and
   rendering the three-dimensional scene using the map.

2. The information processing apparatus according to claim 1, wherein the processor assigns more pixels to a partial region having higher importance.

3. The information processing apparatus according to claim 1, wherein the processor acquires a covariance matrix of the importance distribution by performing the principal component analysis, and acquires the eigenvectors of the importance distribution by performing eigenvalue decomposition on the covariance matrix.

4. The information processing apparatus according to claim 1, wherein, in a case where a ratio of a greatest eigenvalue relative to a smallest eigenvalue of the eigenvectors of the importance distribution exceeds a threshold value, the processor rotates the importance distribution.

5. The information processing apparatus according to claim 1, wherein, in a case where an angle formed between a direction defined by the eigenvector and the predetermined direction is less than a threshold value, the processor does not rotate the importance distribution.

6. The information processing apparatus according to claim 1, wherein the predetermined direction is a horizontal direction or a vertical direction in the map.

7. The information processing apparatus according to claim 1, wherein the map includes a shadow map, a reflective shadow map, or a ray-bundle buffer.

8. A generation method for generating a map for use in rendering a three-dimensional scene, the generation method comprising:
   analyzing, by a processor, an importance distribution in a render target range for which the three-dimensional scene is to be rendered in a perspective for generating the map;
   performing, by the processor, principal component analysis on the importance distribution obtained through the analysis and acquiring eigenvectors of the importance distribution;
   determining, by the processor, whether the eigenvectors of the importance distribution satisfy a predetermined condition, and when the predetermined condition is satisfied, the processor rotates the importance distribution such that a direction defined by an eigenvector is to be a predetermined direction;
   assigning, by the processor, a number of pixels to each partial region in the render target range based on the rotated importance distribution;
   generating, by the processor, the map based on the number of pixels assigned to each partial region; and
   rendering, by the processor, the three-dimensional scene using the map.

9. A non-transitory computer-readable storage medium storing a program for causing one or more computers to function as an information processing apparatus, the information processing apparatus generating a map for use in rendering a three-dimensional scene, the program, when executed by the one or more computers, causing the one or more computers to perform operations comprising:
   analyzing an importance distribution in a render target range for which the three-dimensional scene is to be rendered in a perspective for generating the map;
   performing principal component analysis on the importance distribution obtained through the analysis and acquiring eigenvectors of the importance distribution;
   determining whether the eigenvectors of the importance distribution satisfy a predetermined condition, and when the predetermined condition is satisfied, rotating the importance distribution such that a direction defined by an eigenvector is to be a predetermined direction;

assigning a number of pixels to each partial region in the render target range based on the rotated importance distribution;

generating the map based on the number of pixels assigned to each partial region; and rendering the three-dimensional scene using the map.

* * * * *